INVENTOR.
RICHARD R. MILLER
BY
H. G. Manning
ATTORNEY.

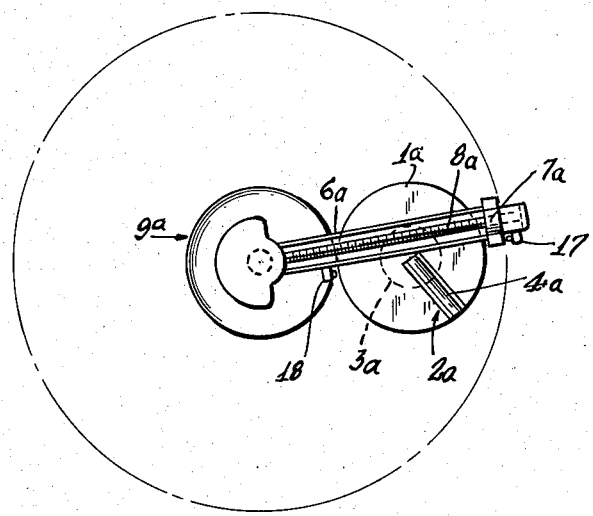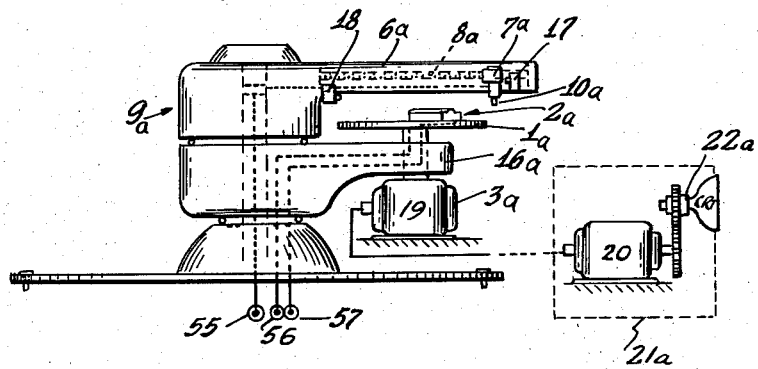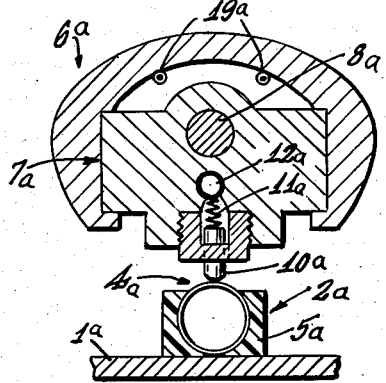

United States Patent Office 2,965,897
Patented Dec. 20, 1960

2,965,897

PULSE ECHO SYSTEM SIGNAL SIMULATOR FOR TESTING AND ANALYZING INDICATOR UNITS

Richard R. Miller, P.O. Box 369, Lakeville, Conn.

Filed Mar. 29, 1954, Ser. No. 419,217

3 Claims. (Cl. 343—17.7)

This invention relates to electronic testing and analyzing devices having special reference to pulse echo equipment. It comprises circuits and combinations of circuits which separately and in combination permit the testing of a pulse echo system indicator unit without employment of the transmitter and receiver of said pulse echo equipment.

The utility of the invention is manifold: Thus, it is of value in testing and analyzing the various circuits which comprise a pulse echo system indicator unit. It may also be employed for instructional and laboratory purposes to provide the wave forms employed in pulse echo systems, and in other systems which require single or double synchronization, said wave forms including symmetrical square waves of adjustable frequency, polarity, amplitude, and occurrence; square waves of adjustable duration at predetermined frequencies of negative or positive polarity and adjustable amplitudes, a synchronization pluse of adjustable polarity, frequency and amplitudes and a delayed synchronized pulse of adjustable delay, negative or positive polarity, and variable amplitude.

The present invention may also be employed to test the separate units before finally assembled.

The present invention may also be used as a means of generating random noise or microphonics, for mixing the initiating or synchronizing pulse with the delayed pulse and the microphonics for the simulation of the output of a pulse-echo system receiver operating under controlled conditions.

For plan position indication, the invention also includes automatically operated mechanical means to simulate the course of a moving object, which means comprises a revolving disc having an adjustable rotating supporting means, combined with a servo-motor which turns in synchronism with said revolving disc.

The objects of the invention are to provide an apparatus of the above nature which will be simple in construction, inexpensive to manufacture, easy to install and manipulate, compact, ornamental in appearance and very efficient and durable in use.

With these and other objects in view, there has been illustrated on the accompanying drawings, one form in which the invention may conveniently be embodied in practice.

In the drawings,

Fig. 2 is a top plan view of the apparatus employed for simulating the plan presentation of pulse echo systems.

Fig. 3 is a side view of the same.

Fig. 4 is a cross-sectional view of a portion of the same, on a larger scale.

Figure 1:
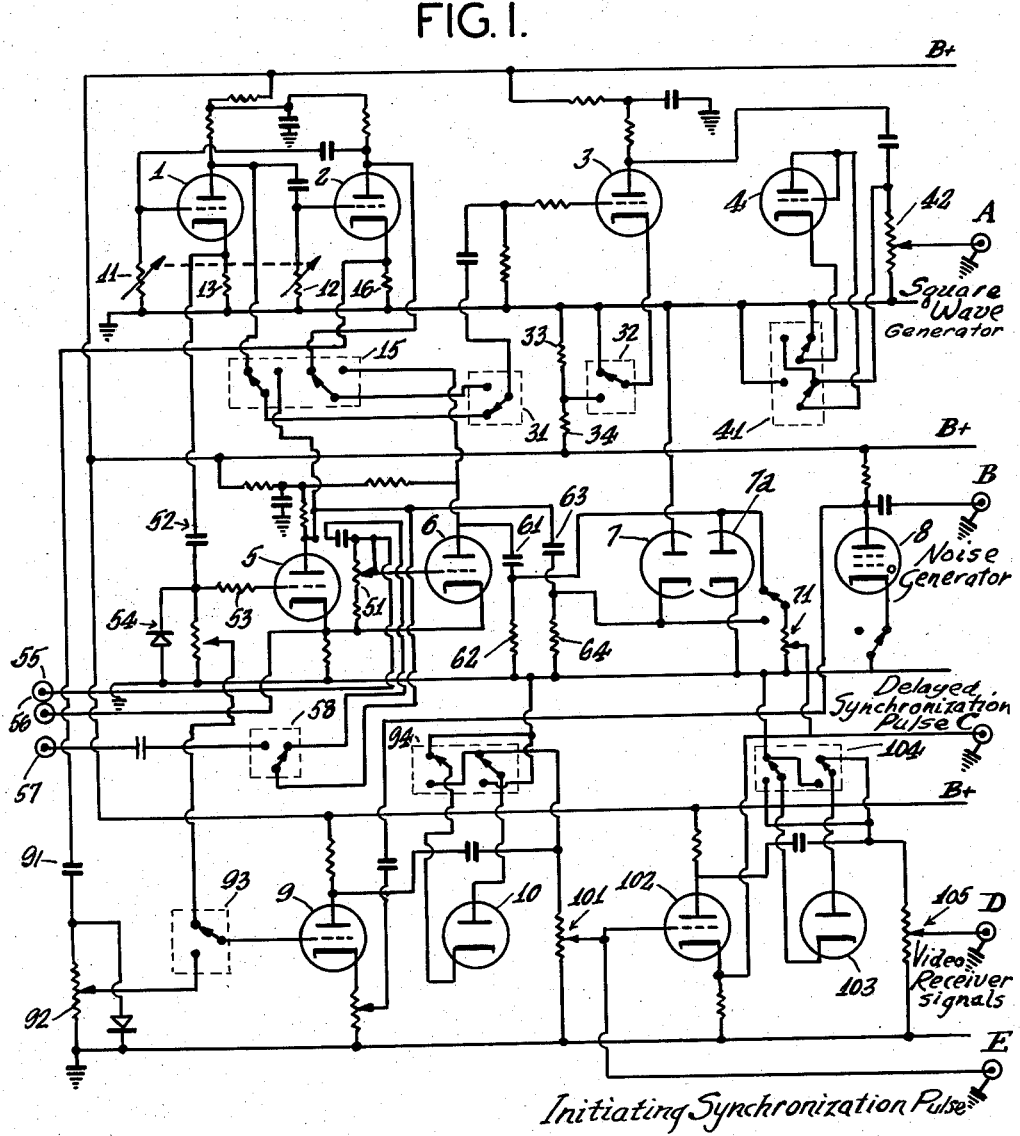
Fig. 1 represents a diagrammatic view of the circuits included in the improved testing and analyzing apparatus.

Referring now to the drawings, in which like reference numerals denote corresponding parts throughout the several views, the numerals 1 and 2 indicate a pair of multivibrator vacuum tubes which form components of a precision-balanced relaxation oscillator for producing a square wave of frequency and duration determined by a pair of potentiometers 11 and 12.

It will be assumed in the following explanation that one cycle of operation is initiated by a negative square wave appearing at the plate of the tube 1.

The numerals 5 and 6 indicate a pair of vacuum tubes which are combined to operate a one-shot multivibrator circuit to produce a square wave of variable duration controlled by a potentiometer 51. The square wave thus produced is initiated by a pulse derived from a cathode resistor 13 differentiated by a capacitor 52 and a resistor 53, and positively restored by a germanium rectifier diode 54.

A vacuum tube 3 and its associated components comprise a shaper which can be controlled to operate at saturation or cut-off by means of a switch 32. As shown in Fig. 1, the tube 3 is operating at saturation and it will be understood that with the switch 32 in its other position the tube 3 will be at cut-off by the application of a positive potential from the voltage dividers 33 and 34 to the cathode of said shaper tube 3.

A double-pole double-throw switch 15 provides means for shifting from a symmetrical square wave of variable frequency generated by tubes 1 and 2, with the switch position as shown in Fig. 1 to a square wave of variable duration, but at a frequency determined by the multivibrator tubes 1 and 2 when in its other position.

A shaper switch 31 permits the selection of the desired square wave at the inception or the termination of a sweep or cycle of operation which is initiated by the negative pulse derived from a cathode resistor 16. This pulse is differentiated in a capacitor 91 and a resistor 92, passes through switch 93 when in its downward position to vacuum tube 9, inverted in a vacuum tube 9 and associated circuits, D.C. restored by a vacuum diode tube 10 and then appearing as a positive synchronization pulse at an outlet E. The tube 10 under the control of the reversing switch 94 provides the required negative or positive D.C. restoration depending upon the polarity input selected by the switch 93.

At output E, therefore, there is available a synchronization pulse of negative or positive polarity, depending upon the setting of the switch 93. Thus, when the switch 93 is in the position illustrated, the pulse is derived from the cathode resistor 13, and is of opposite polarity with respect to that derived from cathode resistor 16. The output synchronization pulse can be varied in amplitude by means of the potentiometer 105.

A tube 4 comprises a diode which under the control of a switch 41 provides negative or positive D.C. restoration of the inputs selected by the switches 15, 31, and 32.

By means of this apparatus the vacuum tubes 1, 2, 3, 4, 5, and 6, with associated components and switches will produce at outlet A, negative or positive square waves (either symmetrical of variable frequency), or square waves of variable duration and adjustable frequency. Such square waves (both symmetrical and unbalanced) may appear at the inception or termination of the sweep, as determined by the positions of the shaper switch 31 and their amplitude may be controlled by a potentiometer 42. The square wave output available at the outlet A can be employed in the known manner in testing various circuits appearing in pulse echo systems, such as rangering circuits, blanking circuits and sweep generating circuits. In laboratory work these square-wave forms are valuable for examining problems of rise time components, modulations of Lissajous patterns etc.

The square wave which appears at the plate of the vacuum tube 5 may be differentiated by the capacitor-resistor combination 63 and 64. Similarly the output of the tube 6 may be differentiated by the capacitor 61 and resistor 62.

A pair of vacuum tubes 7 and 7a serve as D.C. restoration means to produce negative or positive pulses across a potentiometer 71 depending upon the setting of the single-pole double-throw switch connected to said potentiometer, both of said pulses (positive and negative) occurring at a time following the above described synchronization pulse appearing at the outlet E, which time may be varied by the regulation of the potentiometer 51 in the one-shot delay multivibrator above described. The potentiometer 71 serves as a means for regulating the amplitude of said delayed pulses.

The numeral 8 indicates a thyratron for providing a source of "microphonic" signal noise at outlet B. The video signals of radar always contain microphonic noise at various levels of intensity. Such noise can be simulated for test purposes by connection of video circuits to outlet B.

The numeral 9 indicates a triode employed as a mixer and amplifier. It serves to amplify and invert the pulse signals occurring at the potentiometers 53 or at 92, which signals will be positive at 53 and negative at 92 respectively. As described above, the pair of switches 93 and 94, in conjunction with the diode tube 10, provide means for selecting a negative or a positive synchronization pulse of variable amplitude appearing at the outlet E.

The vacuum tube 9 also constitutes means for mixing the initiating pulse with the microphonic noise into a combined output at the plate of said tube. Thus the noise signal at the plate of thyratron 8 is coupled through a condenser to a potentiometer serving as the cathode resistor of the tube 9. The strength of the noise signal added can be controlled by adjustment of the cathode potentiometer associated with the tube 9. The simulated noise can also be switched entirely out of the combination outlet D by open-circuiting the switch in the cathode circuit of thyratron 8. A mixer tube 102 adds the adjustably delayed pulse from the potentiometer 71. A tube 103, in conjunction with a switch 104 and other associated circuitry, provides means of D.C.-restoring the combined output either negatively or positively depending upon the setting of the switch and in accordance with the input polarity selected at the switch 93 to produce at the outlet D combination synchronized signals to simulate the signals occurring in the receiver unit of a pulse echo system. A potentiometer 105 provides means of regulating the amplitude of the D.C. restored and combined signals which appear at an outlet D. The output at outlet E therefore simulates ordinary video signals which are fed into the indicator unit of a radar system, sometimes negatively, sometimes positively, and at various amplitudes. For testing the gain, and proper functioning of the video section of an indicator unit of a pulse echo system, the signals available at the outlet D may be employed in synchronism with the rated repetition rate of the pulse echo system. Pulse repetition rate in the signal simulating circuits described above is controlled by adjustment of the ganged rheostats 11, 12 in the grid circuits of the square wave multivibrator comprising tubes 1 and 2.

Outlet C, connected to the cathode of tube 102, provides a low impedance source of pulses in an adjustable relation with the synchronization pulses appearing at outlet E. The pulses at outlet C can be employed for the testing of blanking pulses in indicator unit 2, and for delayed triggering required in a variety of laboratory experiments in which it may be desired to produce a reaction subsequent to a first reaction but the same repetition rate, e.g. any start-stop mechanism to operate at a desired rate.

The manually-operated means for simulating plan presentation echo signals emanating from objects moving along predetermined courses at variable speeds and direction, "fore and aft," relative to the observing pulse echo system, will be best understood by reference to Figs. 2, 3, and 4. Thus, the numeral 1a indicates a flat disk of suitable diameter supported by a horizontal arm 16a and actuated by a variable speed motor 3a at a speed corresponding to that of a revolving antenna of a pulse echo system. The numeral 2a indicates a resistive block (shown in enlarged section in Fig. 4), wherein 4a is an exposed coiled wire resistor and 5a is an insulating casing therefor.

As clearly shown in Figs. 2 to 4 a hollow arm 6a serves to support a lead screw 8a for driving a carriage 7a from one end of said arm 6a to the other. The lead screw 8a is actuated by a variable motor and transmission mechanism 9a.

The carriage 7a carries means for intermittently contacting the resistive block 2a, including a brush 10a (Fig. 4), which is pressed by a spring 11a (Fig. 4) in contact with a conductor 12a, which is connected with a conductor 55 leading to a wire 55 (Fig. 1).

Similar brush contacts are provided to connect the resistive block 2a by wires 56 and 57 (Fig. 3), leading to wires 56 and 57 of Fig. 1, respectively. It will thus be seen that the resistor block 2a corresponds to the potentiometer 51 of the delay multivibrator of Fig. 1, also that the carriage 7a of Fig. 4 corresponds to the regulating arm of the potentiometer 51 for the delayed synchronized pulse to simulate the echo of a moving object, in a pulse echo system under test.

When using the manually operated device illustrated in Figs. 2, 3 and 4 for simulating moving plan presentation echo signals in conjunction with the circuit shown in Fig. 1, the switch 58 will be swung to the left so that connection is made from the resistor block 2a through wires 15a and 57 to the plate of tube 5. The output of outlet D will be connected to the video input of the radar apparatus being tested and the output at outlet E will be connected with the synchronization input of the radar apparatus being tested. The signals at outlets A, B, and C in Fig. 1 are not required when using the manually operated echo signal simulating device shown in Figs. 2, 3, and 4. It will be apparent that as the brush contact 10a moves in on the arm 6a of the device, the RC time constant of the coupling circuit between tubes 5 and 6 will be reduced, and thus the simulated target echo will appear in the pulse echo system under test, to be closer.

It will also be clear that the arm 6a, bearing the carriage 7a will simulate a course of the moving object.

It will also be understood that by manually swinging the arm 6a and the arm 16a (Figs. 2 and 3) through a full circle, any desired course of an object moving in any direction, fore and aft, may be simulated at a speed determined by the variable reversible motor mechanism 9a.

The motion of the carriage 7a is controlled by a pair of limiting terminal switches 17 and 18. A pair of wires 19a (Fig. 4) lead to and from the limiting switch 17 (Fig. 3), and a switch 58 (Fig. 1) permits shifting from manual to automatic simulation of the echo pulse delay circuit.

In case it is desired to relay the motion of the disk 1a for synchonized rotation of the indicator unit sweep system of a plan position indicator 21a, a servogenerator 19, and a servomotor 20 are provided to rotate a deflection coil 22a.

A further advantage is that the present apparatus may be employed as an electronic switching means of great adaptability, and also as a generator of special signal and noise combinations for experiments in noise suppression.

While there has been disclosed in this specification, one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In apparatus for testing and analyzing radar systems, the combination of electronic means to generate first and second pulses to simulate the respective outputs of a pulse echo system transmitter and receiver having rotating antenna means, said signal generator means including a relaxation oscillator circuit to produce the first pulse and a one-shot multivibrator circuit responsive to said first mentioned circuit to generate said second pulse, each of said circuits including resistive and capacitive elements, at least one of said elements in each of said circuits being variable to control respectively the frequency of said oscillator and the period of said multivibrator, whereby the period of said multivibrator determines the period between said first and second pulses, noise generating means, means to combine the output of said noise generating means with said pulses to produce a video signal simulating the video signals of pulse echo systems operating under actual conditions of use, said resistive element in said multivibrator circuit including a longitudinally extending resistive strip and a contact to establish an electrical connection with medial points on said strip, means to mount said strip for rotation about a fixed axis normal to its length, means to vary the rate of rotation of said strip about said axis to simulate the rotation of a radar antenna, means to mount said contact for movement in a plane normal to the axis of rotation of said strip to establish intermittent electrical connections with said strip during said rotation, and means to move said contact in said plane at varying rates of speed.

2. The invention as defined in claim 1, wherein said means to mount the resistive strip and the contact includes, a pair of arms independently rotatable about a common axis, means to support said strip on one of said arms for rotation about an axis spaced from and parallel to said common axis, and means to movably support said contact on the other of said arms.

3. The invention as defined in claim 2, wherein said support for the contact includes lead screw means extending generally along the length of said other arm, whereby the radial distance between the contact and said common axis may be varied.

References Cited in the file of this patent

UNITED STATES PATENTS

| | | |
|---|---|---|
| 2,491,308 | Yorton et al. | Dec. 13, 1949 |
| 2,505,793 | Rust | May 2, 1950 |
| 2,781,511 | Pear | Feb. 12, 1957 |
| 2,790,168 | Connelly | Apr. 23, 1957 |